United States Patent
Kosem

[15] 3,656,377
[45] Apr. 18, 1972

[54] SURFACE SPEED CONTROL OF SPINDLE-RELATED NUMERICAL CONTROL SYSTEM

[72] Inventor: Marion Kosem, Willoughby Hills, Ohio
[73] Assignee: Allen-Bradley Company, Milwaukee, Wis.
[22] Filed: July 10, 1969
[21] Appl. No.: 840,641

[52] U.S. Cl.................82/1 C, 82/29 A, 318/571, 318/39, 235/151.11
[51] Int. Cl............................................B23b 1/00
[58] Field of Search..............82/29 A, 1 C, 2.2; 318/571, 318/39; 235/151.11

[56] References Cited

UNITED STATES PATENTS

| | | | |
|---|---|---|---|
| 2,561,724 | 7/1951 | Bickel | 82/29 A X |
| 2,600,988 | 6/1952 | Greene et al. | 82/29 A X |
| 2,897,427 | 7/1959 | Bradburn, Jr. | 82/29 A X |
| 3,174,367 | 3/1965 | Lukens | 82/29 A X |

Primary Examiner—Leonidas Vlachos
Attorney—Arnold J. Ericsen and Richard C. Steinmetz

[57] ABSTRACT

In a numerical control system having apparatus for controlling feedrate as a function of spindle speed (angular velocity), a spindle encoder provides a train of basic feed pulses at a frequency $f_o$ as a function of spindle speed. Surface speed of a cutting tool over a workpiece is controlled to a value programmed in linear units where the spindle provides relative rotary motion between the tool and the workpiece by multiplying the frequency $f_o$ by the absolute command position of the tool along an axis perpendicular to the axis of rotation of the spindle, and comparing the resulting product with a train of pulses at a frequency that is a function of programmed surface speed. Any difference drives a bidirectional counter in a direction corresponding to the sign of the difference. A digital-to-analog converter couples the output of the bidirectional counter to a spindle drive mechanism to bring the actual surface speed into agreement with the desired surface speed.

4 Claims, 2 Drawing Figures

INVENTOR.
MARION KOSEM

INVENTOR.
MARION KOSEM 3,656,377

SURFACE SPEED CONTROL OF SPINDLE-RELATED NUMERICAL CONTROL SYSTEM

BACKGROUND OF THE INVENTION

This invention relates to a numerical control system, and more particularly to a system for controlling surface speed of a tool where relative rotary motion is produced between the tool and a workpiece by a spindle.

In apparatus for controlling feedrate in a machine having a spindle which produces relative rotary motion between a cutting tool and a workpiece, the feedrate along two or more orthogonal axes may be programmed in terms of inches per revolution (IPR). If a spindle encoder provides basic feedpulses at a rate proportional to spindle speed (angular velocity), feedrate control as a function of spindle speed is possible. Such control is desirable in order to maintain a desired metal removal rate.

For lathe applications, the metal removal rate is a function of the programmed traverse rate (IPR), the relative tangential velocity between the workpiece and the tool expressed in surface feet per minute (SFM), and the depth of cut. These are the normal parameters expressed in those terms in commonly used machinist handbooks for each particular workpiece material and tool combination. It is desirable to provide a numerical tool control system that maintains a constant surface speed of a workpiece relative to a cutter independent of programmed departures along an axis perpendicular to the turning axis. This has been approximated in the past by additional programming of spindle speed for different segments of the contour being cut. However, it would be desirable to be able to program the desired surface speed independent of contours.

OBJECTS AND SUMMARY OF THE INVENTION

U. S. Pat. application, Ser. No. 840,778, filed by Marion Kosem and Clive P. Hohberger entitled "Method and Apparatus for Feed Rate Control of Spindle Related Numerical Control Systems" discloses a numerical control system which produces a feedrate as a function of the angular velocity of a spindle producing relative motion between a cutting tool and a workpiece. An object of the present invention is to automatically maintain a desired surface speed between a cutting tool and a workpiece.

Still another object of the present invention is to maintain both desired feedrate and surface speed as a function of angular velocity of a spindle that produces relative rotary motion between a cutting tool and a workpiece, particularly where the position of the cutting tool is varied, in response to programmed commands, along an axis normal to the axis of the rotary motion.

These and other objects of the invention are achieved by an arrangement wherein a spindle encoder provides basic feedpulses at a rate proportional to spindle angular velocity. The basic feedpulses are multiplied by the absolute commanded position of the cutting tool along an axis perpendicular to the turning axis of the spindle to obtain a first train of pulses proportional to actual surface speed. A second train of pulses proportional to desired surface speed is produced and compared with the first as to frequency. The difference is continually integrated, and the integral is used to control the spindle drive proportionally. A feedrate generator multiplies the train of basic feedrate pulses by a factor which is a ratio of desired velocity (of the cutting tool relative to a workpiece) to the vectorial distance the tool must travel during a machine cycle in response to programmed departures along one or more axes. The product is then employed to maintain feedrate as a function of spindle angular velocity while spindle drive is controlled as a function of angular velocity to maintain constant the rate at which the tool removes material from the workpiece.

The novel features of the invention are set forth with particularity in the appended claims. The invention will best be understood from the following description when read in conjunction with the accompanying drawings.

DESCRIPTION OF THE PREFERRED EMBODIMENT

Figure 1:
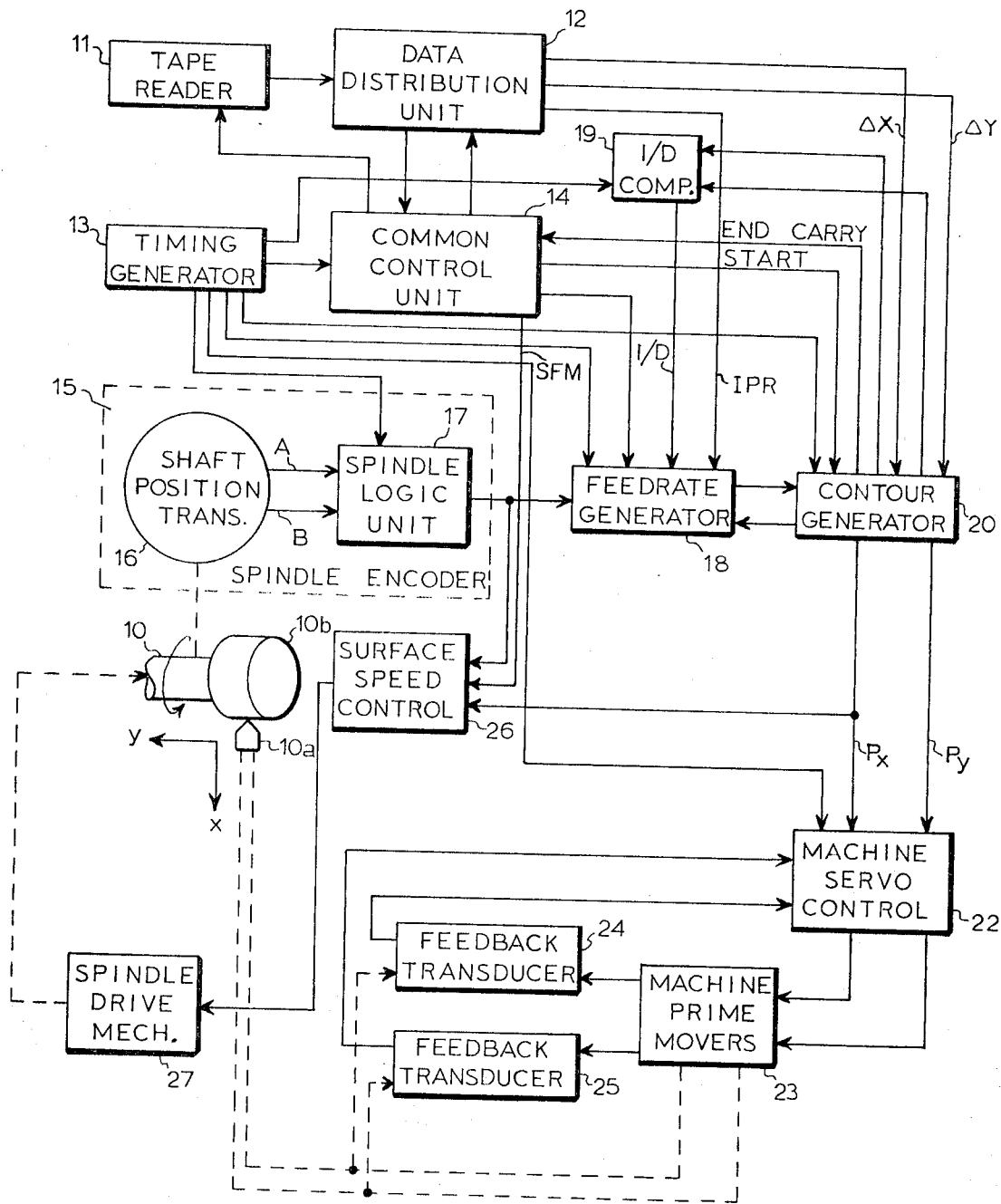
FIG. 1 is a block diagram of an embodiment of the present invention.

Attention is now called to FIG. 1 which illustrates the main portions of a numerical control system, for a machine having a spindle 10, incorporating the present invention. The system includes a tape reader 11 for reading a control program describing incremental coordinate departures of the machine tool axes. The program also includes coded words which designate control functions necessary for automatic operation of a machine tool 10a.

The command data to which the present invention relates is coded on the tape in blocks, each block representing a vectorial distance command in either absolute values X and Y or in incremental form ΔX and ΔY. If in the absolute form, a comparison is made between the command data and the present position of the machine tool (relative to a workpiece 10b being rotated by the spindle 10) to determine the increments the machine tool is to be moved along the various axes, whereas if the data is in the incremental form, the command data is used to move the machine tool the specified increments from its present position. For the purpose of illustrating an embodiment of the present invention, it will be assumed that the command data along two orthogonal axes $x$ and $y$ are in the incremental form, but it should be understood that they may be in the absolute form.

Each block of command data will also include a feedrate word expressed either as a feedrate number (FRN) or as a modal velocity, such as inches per revolution (IPR). If the feedrate is expressed as a modal velocity, apparatus is required to effectively compute the feedrate number from the modal velocity and the vectorial distance D the machine tool is to be moved in response to axis commands in order to control the vectorial velocity of the tool. In the embodiment to be described, it is assumed that feedrate is expressed as a modal velocity as inches per revolution (IPR) of the machine spindle 10.

The numerical control data is read one block at a time into a data distribution unit 12 where the data is decoded for subsequent distribution to proper units of the numerical control system. To illustrate the present invention, a two-axis ($x$ and $y$) control system will be described; application of the present invention to a three-axis system will be obvious to those skilled in the art. Accordingly, the control data to be distributed by the unit 12 consists of axis commands in incremental form (ΔX and ΔY) and feedrate expressed as a modal velocity (IPR).

A timing generator 13 provides basic clock pulses to the entire numerical control system, while a common control unit 14 synchronized by the timing generator 13 provides timing signals to control the proper sequencing of operations throughout the numerical control system.

What has been described thus far is common to many numerical control systems. An improvement over such systems described in the aforesaid copending application comprises a spindle encoder 15 having an incremental rotary shaft position transducer 16 which through a spindle logic unit 17 provides the basic link between a feedrate generator 18 and the spindle 10. The shaft position transducer 16 is mechanically geared to the spindle 10 to provide trains of pulses over lines A and B at a frequency proportional to the rotational speed of the spindle 10. The shaft position transducer 16 may also provide on a third line (not shown) one output pulse per revolution to serve as an index or reference signal for those applications where a synchronized start is required, such as for thread cutting and thread chasing applications.

The shaft position transducer 16 produces, for example, 2,500 square waves per revolution on each of the two lines, A and B, but out of phase by 90°. Thus the output from the shaft position transducer 16 is a pair of square waves. The logic unit 17 receives these signals and converts them into a single pulse train of 10,000 pulses per revolution of the spindle 10.

The programmed feedrate is normally expressed in terms of inches per revolution (IPR) while the spindle encoder 15 produces a number of pulses (e.g., 10,000) per revolution of the spindle 10. The feedrate generator 18 develops an output train of pulses through a feedrate multiplier included therein, at a pulse rate dependent on the rotational speed (angular velocity) of the spindle 10 and the programmed feedrate (IPR). That pulse train is used to maintain a constant vectorial velocity of a cutter through a workpiece independent of programmed departure increments $\Delta X$ and $\Delta Y$, referred to hereinafter as departures or commands.

Since feedrate is programmed as a modal velocity in inches per revolution, instead of a feedrate number (FRN) computed to be equal to a ratio of the desired velocity V to the vectorial distance D of the programmed departures $\Delta X$ and $\Delta Y$, it is necessary to provide the feedrate generator 18 with the reciprocal of D, i.e., 1/D. In order to develop 110, a computer 19 is provided which computes (or approximates) a value D from the programmed departures $\Delta X$ and $\Delta Y$, and from that value computes a number 1/D to be applied in digital form to the feedrate generator 18. The feedrate generator 18 receives pulses at a rate $f_o$ and produces pulses at a rate equal to the product $f_o \cdot$ IPR $\cdot$ 1/D as more fully described in the aforesaid copending application.

A contour generator 20 is adapted to receive the output pulse train from the feedrate generator 18 and to provide to a machine servo control unit 22 metered pulses $P_x$ and $P_y$ to respective x and y axis control servo systems. In the present exemplary embodiment of the invention, the contour generator 20 provides a linear interpolation function using rate multipliers, but it should be understood that the contour generator 20 may alternatively be implemented with digital differential integrators to provide the interpolation functions. It should be further understood that either technique of implementation has a multiple axis capability of either linear or curvilinear interpolation, as is well known to those skilled in the art. Thus, the output of the contour generator 20 is a set of pulse trains $P_x$ and $P_y$, one pulse train for each axis programmed, with the number of pulses metered in each train equal to the departures programmed and at a rate proportional to the pulse rate out of the feedrate generator 18.

The contour generator 20 also uses the pulse train from the feedrate generator 18 as a common time base for the machine control cycle. For example, if the maximum programmable move per block of data is 9.9999 inches, and the number of pulses required to complete the move is 99,999, that number of pulses (or 100,000 pulses for convenience) from the feedrate generator 18 is selected as the period of a machine cycle for executing one block of commands. The contour generator 20 may then contain a five decade counter to count out 100,000 pulses after it receives a start signal from the common control unit 14. Once that number of pulses has been counted, an "end carry" signal is generated to terminate the metering of pulses. The end carry signal is transmitted to the common control unit 14 to call for the next block of data.

The machine servo control 22 accepts the pulse trains $P_x$ and $P_y$ from the contour generator 20 and produces analog signals proportional to the pulse train rates for velocity and position-change control of prime movers 23. The machine servo control 22 also compares commanded position references incremented by the number of pulses $P_x$ and $P_y$ metered with instantaneous servo position data provided by feedback transducers 24 and 25 for the respective axes x and y. When the differences between the commanded position references and the feedback position signals have been reduced to zero, the machine servo control unit 22 stops driving the machine prime movers 23.

The system thus far described provides numerical control with a feedrate proportional to the angular velocity of the spindle 10. In that manner, a desired vectorial velocity of the tool 10a is maintained through the workpiece 10b as a function of the angular velocity of the spindle 10. To maintain a constant surface speed independent of programmed departure $\Delta X$ of the tool 10a along the x axis normal to the turning axis of the spindle and workpiece, a surface speed control unit 26 is provided.

Since the frequency $f_o$ of the pulse train from the spindle logic unit 17 is proportional to actual angular velocity of the workpiece 10b, a signal having a frequency proportional to actual surface speed of the tool 10a relative to the workpiece 10b may be obtained by multiplying the pulse train at the frequency $f_o$ by the distance X of the tool from the turning axis. The value X is obtained by effectively accumulating the departure command $\Delta X$. A spindle drive mechanism 27 is then controlled by a command signal derived from a comparison of the frequency product $f_o \cdot X$ with a frequency proportional to desired surface speed (SFM).

It should be understood that each of the departure commands $\Delta X$ and $\Delta Y$ read from tape includes a sign (one bit) which is stored in the contour generator 20. The interpolation function of the contour generator 20 is then to simply deliver trains of pulses $P_x$ and $P_y$ to the machine servo control 22 equal to the programmed departures $\Delta X$ and $\Delta Y$. The sign for each programmed departure is transmitted to the machine servo control as part of the associated pulse train. Accordingly, the $P_x$ and $P_y$ pulse feed channels of FIG. 1 are to be interpreted as including sign data on separate lines.

Since the $P_x$ feed channel includes the sign of the programmed departure $\Delta X$, and up-down counter may be employed to accumulate the departure commands $\Delta X$ by counting up or down the $P_x$ pulses in response to a positive or negative sign. To accomplish that, the $P_x$ pulse feed channel from the contour generator 20 to the machine servo control 22 is also connected to the surface feed control 26.

Figure 2:
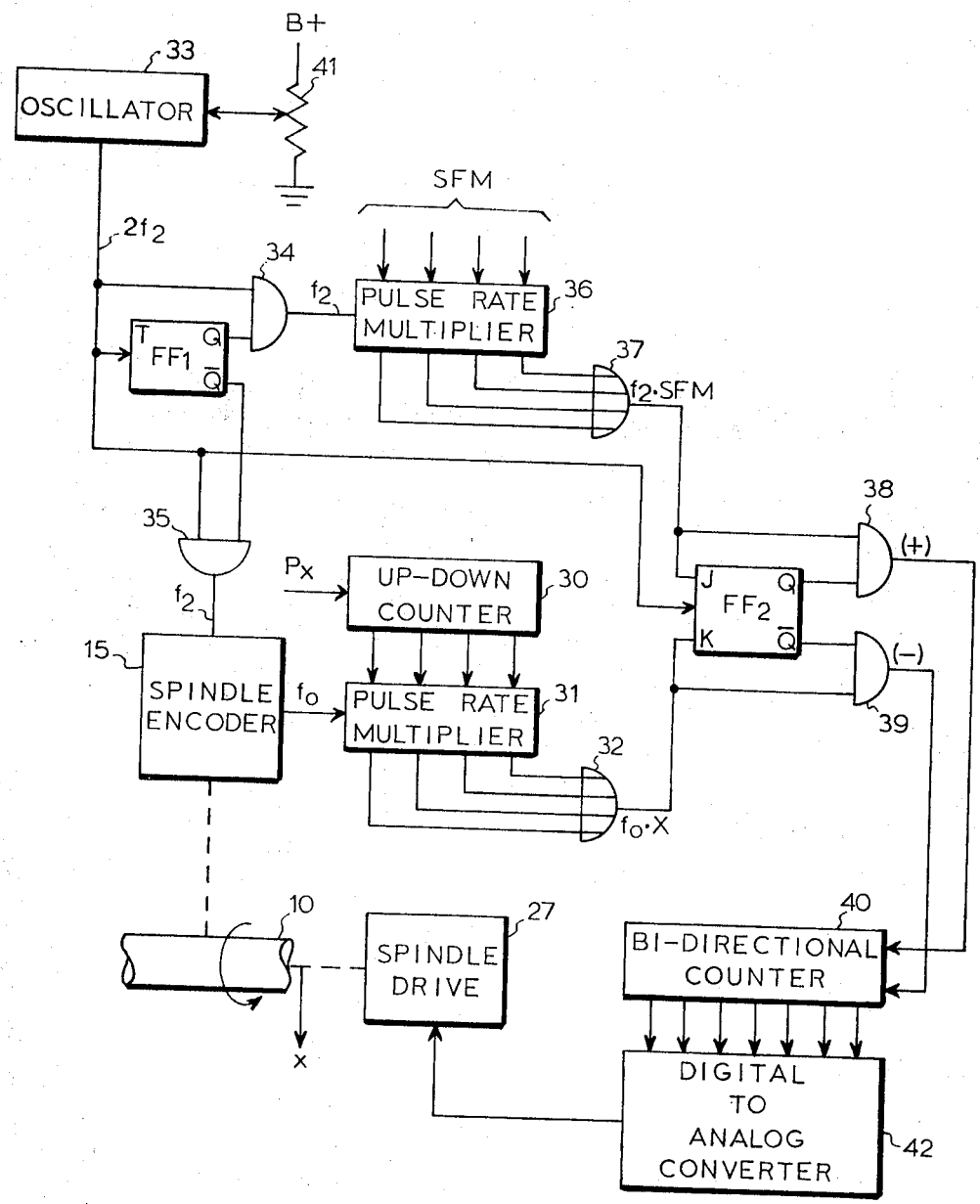
FIG. 2 is a block diagram of an embodiment of a surface speed control system of FIG. 1.

A preferred embodiment of the surface speed control unit 26 will now be described with reference to FIG. 2. Its importance in a spindle-related numerical control system, such as for lathe applications, is that a chip load on the cutting tool, i.e., the metal removing rate, is a function of the programmed traverse rate expressed in inches per revolution (IPR), the depth of the cut, and the relative tangential velocity between the workpiece and the tool.

The desired tangential velocity is programmed as surface feed directly in linear units such as surface feet per minute (SFM). If this programmed SFM can be controlled along with the programmed traverse rate (IPR), constant chip load control is achieved as long as a constant depth of cut is maintained.

The surface feed for a turning operation is a function of the spindle angular velocity and the workpiece cutting radius along the x axis. The absolute position of the tool along the x axis is maintained by an up-down counter 30 which counts up $P_x$ pulses for each incremental departure $\Delta X$ in a direction away from the spindle axis, and counts down $P_x$ pulses for each incremental departure in the opposite direction. In that manner, at any given time during the execution of a command, the contents of the counter 30 provide an instantaneous value of X, the position of the tool 10a on the x axis.

The relationship between the surface feed (tangential velocity V) and the spindle angular velocity is expressed as:
$$V = R\omega$$
where R is the radial distance of the cutting tool 10a from the spindle axis and $\omega$ is the angular velocity. Since the x accumulator 30 contains the radius information, and the frequency $f_o$ from the spindle encoder 15 (FIG. 1) is proportional to angular velocity, the relationship of surface speed may be expressed as:
$$V = X \cdot f$$
Accordingly, to obtain a train of pulses at a frequency proportional to the actual tangential velocity (surface feed) at any given time, the pulse train from the spindle encoder 15 at frequency $f_o$ is multiplied by the contents of the accumulator 30 through a pulse rate multiplier 31. The output of the pulse rate multiplier provided through an OR gate 32 is a frequency $f_o \cdot X$ proportional to the actual surface feed.

A train of pulses at a frequency proportional to the desired surface feed is generated by using a signal at a constant frequency $2f_2$ from a voltage controlled oscillator 33. A flip-flop $FF_1$ is triggered by that signal to provide through AND gates 34 and 35 out-of-phase signals each of which is at a frequency $f_2$. The signal from the AND gate 35 is then provided as the synchronizing clock for the spindle encoder 15. In that manner, the train of pulses produced by the logic unit 17 of the spindle encoder 15 as described with reference to FIG. 1 will guarantee that the train of pulses at a frequency $f_o \cdot X$ from the OR gate 32 will be out-of-phase with a train of pulses at a frequency $f_2 \cdot SFM$ derived from a pulse rate multiplier 36 and an OR gate 37.

The multiplier SFM is a programmed value for desired surface feed expressed in surface feet per minute. Thus the frequency $f_2 \cdot SFM$ is proportional to the desired surface feed while the frequency $f_o \cdot X$ is proportional to the actual surface feed. The two frequencies are then compared by an anti-coincidence circuit comprising a JK flip-flop $FF_2$ and a pair of AND gates 38 and 39. The output signal appearing at the output of one of the two AND gates 38 and 39 will have a frequency equal to the difference between the desired frequency $f_2 \cdot SFM$ and the actual frequency $f_o \cdot X$. If $f_2 \cdot SFM$ is greater than $f_o \cdot X$, the difference frequency from the AND gate 38 will cause the contents of a bidirectional counter 40 to be incremented. Conversely, if the frequency $f_o \cdot X$ is greater than the frequency $f_2 \cdot SFM$, the difference frequency at the output of the AND gate 39 will cause the contents of the bidirectional counter 40 to be decremented. If the actual frequency $f_o \cdot X$ is equal to the desired frequency $f_2 \cdot SFM$, neither of the AND gates 38 and 39 will transmit any pulses to the bidirectional counter 40.

It should be noted that the frequency $f_2$ selected is determined by the units chosen for surface feed programming such that the command surface feed $f_2 \cdot SFM$ will equal $f_o \cdot X$ in a stabilized loop condition. Thus units other than surface feed per minute may be programmed by selecting an appropriate frequency $f_2$. The selection is made by an adjustment of a control voltage on the oscillator 33, such as by a potentiometer 41, to produce a signal at twice the desired frequency $f_2$. The position of the potentiometer 41 may, of course, be varied at any time to override the programmed surface feed.

To understand how the flip-flop $FF_2$ cooperates with AND gates 38 and 39 to obtain a difference frequency on one of two output lines connected to the bidirectional counter 40, it should be recalled that the pulse train at the frequency $f_2 \cdot SFM$ is out of phase with the pulse train at the frequency $f_o \cdot X$. It should also be noted that the JK flip-flop $FF_2$ is clocked by the same signal that triggers the flip-flop $FF_1$ at a frequency $2f_2$. Assuming that the frequencies $f_2 \cdot SFM$ and $f_o \cdot X$ are equal, the J and K input terminals of the flip-flop $FF_2$ will be alternately high during the clock period of the signal at the frequency $2f_2$. Accordingly, a clock pulse will first set the flip-flop $FF_2$, thereby enabling the AND gate 38, but before another pulse is applied to the J input terminal, the flip-flop $FF_2$ is reset by a subsequent clock pulse occurring while the K input terminal is high. Accordingly, the AND gate 38 is disabled before it can transmit a pulse. Similarly, after the flip-flop $FF_2$ has been reset, to enable the AND gate 39, a clock pulse will set the flip-flop $FF_1$ during the next pulse at the J input terminal before another pulse will occur at the K input terminal. In that manner, the AND gate 39 is disabled before it can transmit a pulse. Consequently, neither of the AND gates 38 and 39 will transmit any pulses as long as the frequencies $f_2 \cdot SFM$ and $f_o \cdot X$ are equal.

If the frequency $f_2 \cdot SFM$ is greater, it becomes possible for the JK flip-flop $FF_2$ to be set and for a subsequent pulse to appear at the J input terminal before it is reset. Thus one or more pulses will be transmitted by the AND gate 38 each time the JK flip-flop is set. However, no pulses will be transmitted by the AND gate 39 since the flip-flop will be set before a subsequent pulse will appear at the K input terminal as long as the frequency $f_2 \cdot SFM$ remains greater than the frequency $f_o \cdot X$. Similarly, if the frequency $f_o \cdot X$ is greater than the frequency $f_2 \cdot SFM$, only the AND gate 39 will transmit pulses.

Assuming that the frequency $f_o \cdot X$ is greater than the frequency $f_2 \cdot SFM$, i.e., assuming the actual surface feed is greater than the desired surface feed (SFM), the correction required is a reduction in the speed of the drive mechanism 27 for the spindle 10. That reduction is brought about by pulses transmitted through the AND gate 39 decrementing the bidirectional counter 40. A digital-to-analog converter 42 connected to the bidirectional counter 40 then delivers to the spindle drive 27 a control signal of lower amplitude.

The spindle drive 27 is basically a power amplifier for a spindle drive motor. The characteristics of a particular spindle drive mechanism will vary, but regardless of the type, a closed control loop is provided through the spindle encoder 15, pulse rate multiplier 31 and bidirectional counter 40 (with the programmed value SFM functioning as the set point for the control loop) since the spindle receives its power from the spindle drive mechanism 27 and the signal from the digital-to-analog converter 42 is employed to control the spindle drive power.

There are definite advantages to this type of close-loop control. The first is accuracy since any deviation within the resolution of the system is amplified and corrected by the feedback. The resolution of the feedback system may of course be increased by increasing the basic clock frequency $2f_2$, and by increasing proportionately the pulses per revolution of the signals A and B (FIG. 3) from which the signal frequency $f_o$ is derived. The second advantage is that the components within the loop are not critical. For example, the digital-to-analog converter 42 need not necessarily have an exactly linear converting function. Since the loop is closed, the bidirectional counter 40 will settle out at any number which will bring about an equality between the desired (programmed) surface feed and the actual surface feed.

What is claimed is:

1. In a system for numerical control of a tool in a machine, said machine having a mechanism which moves said tool in a plurality of orthogonal directions relative to a workpiece in response to programmed commands, one of said directions being normal to an axis of relative rotation between said tool and said workpiece, a method for maintaining a desired metal removal rate comprising the steps of generating a first signal having a value proportional to angular velocity of said rotation between said tool and said workpiece, multiplying said first signal by a value proportional to the absolute position of said tool along an axis normal to the axis of relative rotary motion between said workpiece and said tool to obtain a second signal having a value proportional to actual surface speed of said tool relative to said workpiece, generating a third signal having a value proportional to said desired surface speed, comparing values of said second and third signals, and generating a control signal having a value proportional to the difference therebetween, varying the angular velocity of said relative rotary motion in accordance with the value of said control signal to reduce said difference, thereby maintaining surface speed of said tool relative to said workpiece at said desired surface speed, multiplying said first signal by a value equal to a ratio of desired vectorial velocity of said tool relative to said workpiece to the vectorial sum of motions called for by commanded linear motions along said orthogonal directions to obtain a fourth signal, and producing from said fourth signal a set of pulse trains, one train for each direction of commanded linear motion of said tool relative to said workpiece, a given train having a number of pulses proportional to the distance of motion commanded in a given direction at a pulse rate proportional to said ratio, whereby the rate of removing material from said workpiece by said tool is maintained constant.

2. In a system for numerical control of a tool of a machine, said machine having a mechanism which moves said tool in a plurality of orthogonal directions relative to a workpiece in response to programmed commands, one of said directions being normal to an axis of relative rotation between said tool and said workpiece, a method of tool control comprising the steps of producing a first signal having a value proportional to angular velocity of said relative rotation between said tool and said workpiece, providing from said first signal a second signal having a value proportional to a desired traverse velocity of said tool relative to said workpiece in a direction that is a vector of commanded motions in said plurality of orthogonal directions, providing from said second signal a set of output signals, each output signal representing a programmed command for one of said plurality of orthogonal directions, each output signal providing a number of pulses equal to commanded motion in a direction associated therewith at a rate proportional to said value of said second signal, multiplying said first signal by a value equal to the absolute position of said tool along an axis normal to the axis of relative rotary motion between said workpiece and said tool to obtain a third signal having a value proportional to actual surface speed of said tool relative to said workpiece, generating a fourth signal having a value proportional to a desired surface speed, comparing values of said third and fourth signals, and generating a control signal having a value proportional to the difference therebetween, and varying the angular velocity of said relative rotary motion in accordance with the value of said control signal, whereby the rate of removing material from said workpiece by said tool is maintained constant.

3. In a system for numerical control of a tool in a machine, said machine having a mechanism which moves said tool in a plurality of orthogonal directions relative to a workpiece in response to programmed commands, one of said directions being normal to an axis of relative rotation between said tool and said workpiece produced by a spindle, the combination comprising means responsive to rotation of said spindle, for generating a first signal having a value proportional to angular velocity of said spindle, means for generating a second signal having a value proportional to the absolute position of said tool along an axis normal to the axes of relative rotary motion between said workpiece and said tool, means for multiplying said first signal by said second signal to obtain a third signal having a value proportional to actual surface speed of said tool relative to said workpiece, means for providing a fourth signal having a value proportional to desired surface speed, means for comparing values of said third and fourth signals, and generating a control signal having a value proportioned to the difference between said third and fourth signal values, means responsive to said control signal for varying the angular velocity of said relative motion to reduce said difference, thereby maintaining surface speed of said tool relative to said workpiece at said desired surface speed, means for producing a feedrate control signal having a value equal to a ratio of desired vectorial velocity of said tool relative to said workpiece to the vectorial sum of motions called for by commanded linear motions along said orthogonal directions, means for multiplying said first signal by said feedrate control signal to obtain a fourth signal having a value equal to the product of the values of said first and feedrate control signals, and means responsive to said fourth signal for producing a set of pulse trains, one train for each direction of commanded linear motion of said tool relative to said workpiece, a given train having a number of pulses proportional for the distance of motion commanded in a given direction at a pulse rate proportional to said feedrate control signal, whereby the rate of removing material from said workpiece by said tool is maintained constant.

4. In a system for numerical control of a tool of a machine, said machine having a mechanism which moves said tool in a plurality of orthogonal directions relative to a workpiece in response to programmed commands, one of said directions being normal to an axis of relative rotation between said tool and said workpiece, the combination comprising means for producing a first signal having a value proportional to angular velocity of said relative rotation between said tool and said workpiece, means for providing from said first signal a second signal having a value proportional to a desired traverse velocity of said tool relative to said workpiece in a direction that is a vectorial sum of commanded motions in said plurality of orthogonal directions, means for providing from said second signal a plurality of output signals representing one of said plurality of orthogonal directions, each output signal providing a number of pulses equal to commanded motion in a direction associated therewith at a rate proportional to said value of said second signal, means for multiplying said first signal by a value equal to the absolute position of said tool along an axis normal to the axis of relative rotary motion between said workpiece and said tool to obtain a third signal having a value proportional to actual surface speed of said tool relative to said workpiece, means for generating a fourth signal having a value proportional to said desired surface speed, means for comparing values of said third and fourth signals, and generating a control signal having a value proportional to the difference therebetween, and means for varying the angular velocity of said relative rotary motion in accordance with the value of said control signal, whereby the rate of removing material from said workpiece by said tool is maintained constant.

* * * * *

PO-1050
(5/69)

UNITED STATES PATENT OFFICE
CERTIFICATE OF CORRECTION

Patent No. 3,656,377          Dated April 18, 1972

Inventor(s) Marion Kosem

It is certified that error appears in the above-identified patent and that said Letters Patent are hereby corrected as shown below:

Column 3, Line 20      "110" should read --1/D--

Column 4, Line 70      "V=X·f" should read --V=X·$f_o$--

Signed and sealed this 23rd day of January 1973.

(SEAL)
Attest:

EDWARD M.FLETCHER,JR.         ROBERT GOTTSCHALK
Attesting Officer               Commissioner of Patents